Aug. 7, 1962 G. GELOSO ET AL 3,048,143

TRANSLATION INDICATOR OF THE RECORDING
AREAS ON A MAGNETIC TAPE
Filed Oct. 24, 1960

INVENTORS
G. Geloso + A. Castelli
BY
Bierman + Bierman
Attorneys

United States Patent Office 3,048,143
Patented Aug. 7, 1962

3,048,143

TRANSLATION INDICATOR OF THE RECORDING AREAS ON A MAGNETIC TAPE

Giovanni Geloso and Adolfo Castelli, both of Viale Brenta 29, Milan, Italy

Filed Oct. 24, 1960, Ser. No. 64,449
5 Claims. (Cl. 116—135)

Figures 1, 2:
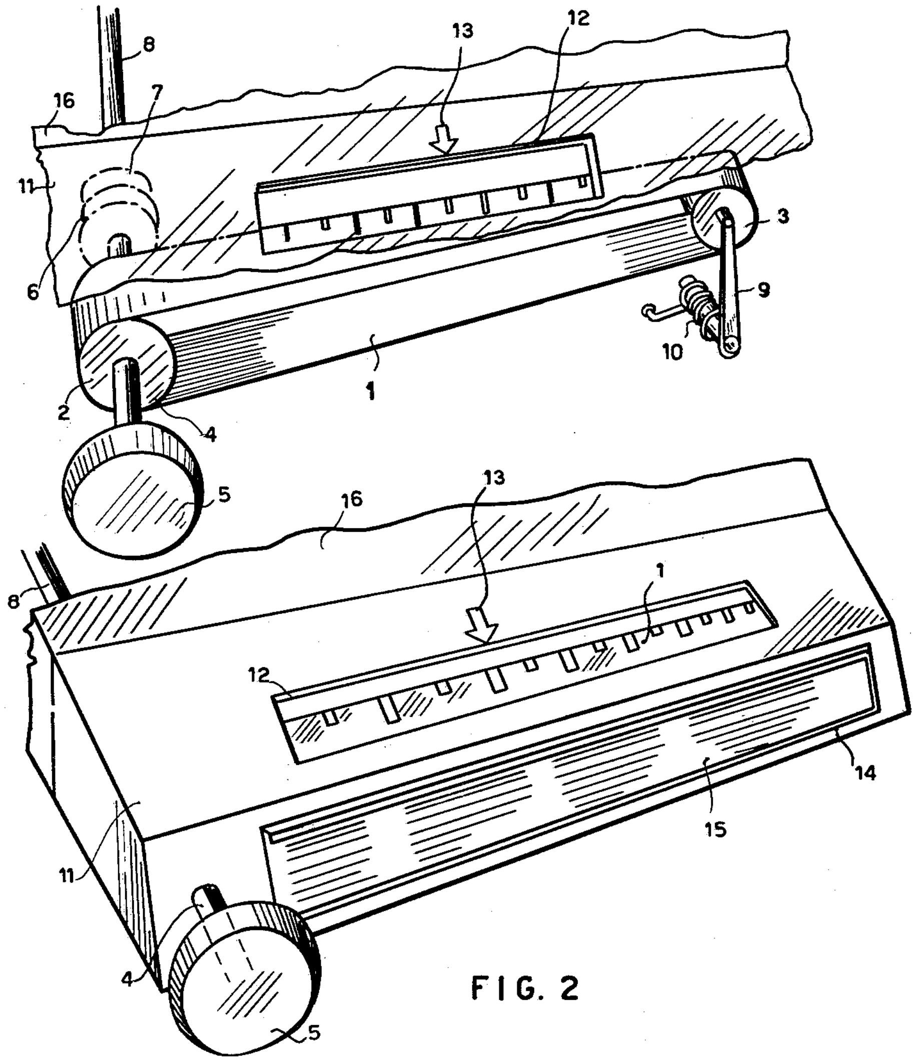

The object of present invention is a translation indicator that enables a ready control even though observation thereof takes place at a noticeable distance from the indicator itself, the instantaneous length of the gradually winding up magnetic tape on (or unwinding from) the associated spools, and moreover a ready and exact ascertainment of the preselected areas in said magnetic tape.

Said indicator, particularly suitable for magnetophones, is substantially characterized in that it comprises a graduated belt, which is marked with different indications and colours and stretched between at least two pulleys, one of which is a tension pulley and the other a driving pulley associated through friction means with a rotation shaft synchronized with the driving roller of the magnetic tape and provided with control means to cause its manual rotation in an independent way with respect to said shaft; the whole is contained in a case provided with slots or openings and at least one pointer, graduation or other registering mark at the little belt and with a hole allowing the manual control means to pass through this hole.

The means for the manual control of the little belt are practically embodied by a projecting handle that is coaxial and secured to said pulley.

The accompanying drawing shows by way of example a diagrammatic representation of an embodiment of the present invention.

FIGURE 1 is a perspective view of the device with a portion of the case broken away to reveal the inside motion members of the indicator and FIGURE 2 is a perspective view of the indicator contained inside of its case.

In the drawing, 1 indicates the little belt as stretched between the driving pulley 2 and the tension pulley 3.

The outside face of said little belt has some graduations corresponding to a determined length of the registration tape as unwound from its spool and not shown in the drawing.

Pulley 2 is keyed to the same shaft 4, where are keyed the knob 5 for the manual control thereof and one of the members 6 co-operating with the other member 7 of shaft 8; said members 6 and 7 form a friction coupling for the transmission of the rotation movement of shaft 8, that is synchronized with the rotation movement of magnetic tape driving roller (not shown in the drawing).

Said friction coupling, which is suitably calibrated, enables an easy sliding of member 6 on member 7 by means of handle 5, when there is required the registering of belt graduation with the position of the magnetic tape registrated (or to be registrated) areas.

Pulley 3 is arranged at the end of an oscillating arm 9, provided with a return spring 10, causing tension of the belt 1 through said pulley.

A case 11, to cover the inside of the translation indicator, is provided at the belt 1 with a slot 12 with at least one pointer 13 that is stationary or sliding along one of the slot edges.

The same case or container 11 is provided with a frame 14, whereinto thin cardboards 15, provided with indications referring to the magnetic tape recordings are removably inserted.

In the drawing, 16 indicates a portion of the recording apparatus with which the translation indicator is associated.

We claim:

1. An indicator structure for magnetic tape recorders comprising a casing, an elongated slot in the top of said casing, a pair of pulleys at opposite sides of said slot, an endless belt passing over said pulleys, the upper surface of said belt being visible through said slot, indicia on said upper surface, a pointer on the top of said casing at the edge of said slot adjacent to said indicia, one of said pulleys being a driver, manual means for driving said pulley, a drive shaft for said pulley, and friction coupling means between said shaft and said driver.

2. An indicator according to claim 1 characterized in that the front of said casing has a frame, and a card removably held in said frame.

3. An indicator according to claim 1 characterized in that said tape driving means and driving pulley are mounted on shafts which are in axial alinement.

4. An indicator according to claim 1 characterized in that a knob attached to said driving pulley constitutes said manual means.

5. An indicator according to claim 1 characterized in that a tension device is attached to said tension pulley to maintain said belt taut.

References Cited in the file of this patent

UNITED STATES PATENTS

| | | |
|---|---|---|
| 1,665,891 | Nystrom | Apr. 10, 1928 |
| 1,734,068 | Ziola | Nov. 5, 1929 |
| 1,860,678 | Langley | May 31, 1932 |
| 2,154,406 | Marbolz | Apr. 11, 1939 |
| 2,632,060 | Foote | Mar. 17, 1953 |

FOREIGN PATENTS

| | | |
|---|---|---|
| 554,168 | Italy | Jan. 7, 1957 |
| 1,235,183 | France | May 23, 1960 |